（12）United States Patent
Sunnarborg (10) Patent No.: US 7,975,845 B2
(45) Date of Patent: Jul. 12, 2011

(54) DURABLE CONTAINER FOR ELONGATED MEASURING DEVICES

(75) Inventor: Bradley Sunnarborg, Los Osos, CA (US)

(73) Assignee: Bradley Sunnarborg, Los Osos, CA (US)

( * ) Notice: Subject to any disclaimer, the term of this patent is extended or adjusted under 35 U.S.C. 154(b) by 0 days.

(21) Appl. No.: 11/623,262

(22) Filed: Jan. 15, 2007

(65) Prior Publication Data

US 2007/0163900 A1    Jul. 19, 2007

Related U.S. Application Data

(60) Provisional application No. 60/759,721, filed on Jan. 17, 2006.

(51) Int. Cl.
*B65D 85/38* (2006.01)
*A45C 11/26* (2006.01)
*A45C 13/18* (2006.01)

(52) U.S. Cl. ............................ 206/349; 206/1.5; 206/305

(58) Field of Classification Search .................. 206/305, 206/349, 443, 576, 1.5
See application file for complete search history.

(56) References Cited

U.S. PATENT DOCUMENTS

| | | | | |
|---|---|---|---|---|
| 1,316,870 | A | * | 9/1919 | Wacker .......................... 206/216 |
| 2,846,766 | A | | 8/1958 | Harter |
| 3,323,755 | A | * | 6/1967 | Tearne et al. .................. 406/188 |
| 3,670,936 | A | * | 6/1972 | Pronovost et al. ............ 224/540 |
| 3,927,792 | A | * | 12/1975 | Andrade et al. .............. 220/210 |
| 4,429,929 | A | * | 2/1984 | Stepp ............................ 312/107 |
| 4,674,933 | A | * | 6/1987 | Brown ........................... 414/24.6 |
| 4,754,873 | A | | 7/1988 | Rawlings et al. |
| 4,863,022 | A | | 9/1989 | Czopor |
| D322,716 | S | | 12/1991 | Morris et al. |
| 5,102,020 | A | * | 4/1992 | Walker et al. ................. 224/29.5 |
| 5,119,936 | A | | 6/1992 | Sevey |
| 5,263,584 | A | | 11/1993 | Sevey |
| 5,288,000 | A | * | 2/1994 | Adamson ....................... 224/522 |
| 5,372,250 | A | | 12/1994 | Johnson |

(Continued)

OTHER PUBLICATIONS

STABILA, carrying case. Downloaded from www.stabila.com on Jan. 15, 2007.

(Continued)

*Primary Examiner* — Jila M Mohandesi
*Assistant Examiner* — Sharon M Prange
(74) *Attorney, Agent, or Firm* — Dergosits & Noah LLP (57) ABSTRACT

A sturdy container to store, transport and securely maintain a measuring device, for example, a spirit level or electronic equivalents thereof. The container comprises an elongated conduit constructed from for example, an organic polymeric material (PVC), carbon fiber, fiberglass or metal. The elongated conduit includes an interior cavity dimensioned to fully encompass one or more measuring device(s) to be securely maintained therein. A head cap assembly is generally provided at a first longitudinal end of the elongated conduit, the head cap including an aperture in communication with the interior cavity, and the aperture dimensioned to receive at least one of the measuring devices therethrough. A door is provided on the head cap and is dimensioned to lateral span the aperture when disposed in a closed position. A lockable latch is provided to maintain the door in the closed position. An end cap is provided on a second longitudinal end of the elongated conduit. A counterforce element may be disposed within the elongated conduit in proximity to or incorporated into the end cap. The counterforce element is aligned to generate a longitudinal counterforce on the measuring devices when an end of the measuring device(s) compressively engages the counterforce element.

16 Claims, 8 Drawing Sheets

U.S. PATENT DOCUMENTS

| | | | |
|---|---|---|---|
| 5,464,141 A * | 11/1995 | Brindle | 224/328 |
| 5,850,916 A | 12/1998 | Pettersson et al. | |
| 5,979,649 A * | 11/1999 | Rosler | 206/379 |
| 6,205,668 B1 | 3/2001 | Fournier | |
| 6,561,348 B2 * | 5/2003 | Kuo | 206/315.1 |
| D505,260 S | 5/2005 | Gruetzmacher | |
| 6,926,143 B1 | 8/2005 | Chen | |
| 2003/0136700 A1 * | 7/2003 | Zeller | 206/524.4 |
| 2005/0098458 A1 | 5/2005 | Gruetzmacher et al. | |
| 2006/0289319 A1 * | 12/2006 | Lin | 206/315.1 |

OTHER PUBLICATIONS

Sunnarborg, Levelguard downloaded from www.levelguard.com on Jan. 15, 2007. Not admitted as prior art.

* cited by examiner

DURABLE CONTAINER FOR ELONGATED MEASURING DEVICES

CROSS-REFERENCE TO RELATED APPLICATIONS

This application is a non-provisional application claiming benefit and priority under 35 U.S.C. §119(e) from applicant's U.S. provisional application Ser. No. 60/759,721, filed on Jan. 17, 2006, to the instant inventor; said provisional application is hereby incorporated by reference in its entirety as if fully set forth herein.

FEDERALLY SPONSORED RESEARCH AND DEVELOPMENT

Not Applicable

REFERENCE TO A MICROFICHE APPENDIX

Not Applicable

RELEVANT INVENTIVE FIELD

The present inventive embodiments relate to a container and more specifically to a container arranged to securely maintain one or more measuring devices such as spirit levels.

BACKGROUND

Measuring devices, for example spirit levels, require a sturdy container to prevent accidental damage when not in use. In addition, these measuring devices are expensive and are occasionally stolen from a worksite or motor vehicle when left unattended. As such, a container which prevents accidental damage and minimizes the likelihood of theft is desirable in the relevant art.

SUMMARY

The various exemplary embodiments as described herein address the need in the relevant art and provides for a lockable containers for elongated measuring devices. The lockable container may be affixed to a motor vehicle to prevent accidental damage, loss or theft. In an exemplary embodiment, a container for holding one or more measuring devices is provided which comprises an elongated conduit. Dimensions of the elongated conduit are vary from approximately 72 to 100 inches in length and having an inner cross sectional area varying from approximately 4 to 16 square inches.

The elongated conduit includes an interior cavity dimensioned to fully encompass the measuring device(s). A generally trapezoidal shaped head cap is provided at one longitudinal end of the elongated conduit. The head cap includes an aperture in communication with the interior cavity. The aperture is dimensioned to receive at least one of the measuring devices therethrough. An end cap is provided on the opposite longitudinal end of the elongated conduit and aligned in opposition to the head cap.

The head cap includes a door dimensioned to span the aperture when disposed in a closed position. A latch may be provided to retain the door in the closed position. The latch may include a lock. In an exemplary embodiment, a counterforce element, such as a spring may be disposed within the elongated conduit in proximity to the end cap, and aligned to generate a longitudinal counterforce on the measuring device(s) when an end of the measuring devices compressively engages the counterforce element. The longitudinal counterforce is directed toward the head cap and is intended to longitudinally eject a small portion of the measuring devices to allow simple removal by a tradesman.

In another exemplary embodiment, the measuring devices are compressively retained within the interior cavity by the longitudinal counterforce generated between the door and the counterforce element when the door is disposed in the closed position.

In another exemplary embodiment, a polymeric liner dimensioned to fit within the interior cavity is provided. The polymeric liner provides a smooth interior surface which allows the measuring device(s) to be inserted and removed without binding or scratching of its surface(s). The polymeric liner is dimensioned to span a longitudinal distance at least between the head cap and the counterforce element and includes a plurality of resilient contact surfaces disposed on an outer surface of the liner. The plurality of resilient contact surfaces are arranged to uniformly engage a portion of the interior surface of the elongated conduit sufficiently to maintain the polymeric liner within the interior cavity.

In various exemplary embodiments, the elongated conduit may be constructed from extruded aluminum, an impact resistant polymeric material, carbon fiber or fiberglass; a plurality of slidably mounted brackets may be used to affix the container to another structure such as a rack on a motor vehicle; and the elongated conduit is dimensioned to slidably fit within another container.

BRIEF DESCRIPTION OF DRAWINGS

The features and advantages of the various inventive embodiments will become apparent from the following detailed description when considered in conjunction with the accompanying drawings. Where possible, the same reference numerals and characters are used to denote like features, elements, components or portions. It is intended that changes and modifications can be made to the described embodiment without departing from the true scope and spirit of the various inventive embodiments as defined by the claims.

FIG. 6—depicts an implementation of the high security exemplary embodiment.

FIG. 6A—depicts a detailed head cap perspective view of a measuring device being inserted into the high security embodiment FIG. 6B—depicts a detailed end cap perspective view of a measuring device being inserted into the high security embodiment.

DETAILED DESCRIPTION

Various exemplary embodiments for a sturdy container to store, transport and securely maintain a measuring device. The measuring devices include for example, a spirit level or electronic equivalents thereof (e.g., laser and/or digital level.) A spirit level (i.e., bubble level) is a device designed to indicate whether a surface is level or plumb. Different types of spirit levels are commonly used by carpenters, stone masons, bricklayers, other building and trades workers, surveyors, millwrights and other metalworkers. Traditional spirit levels feature a slightly curved glass tube which is incompletely filled with a colored and transparent liquid, usually a "spirit" leaving a bubble in the tube. The term "spirit" is a synonym for ethanol, hence the name "spirit."

More recently, optical and electronic versions of the spirit level are being manufactured. Spirit levels are generally manufactured in rectangular aluminum or polymeric frames which render these devices susceptible to damage, particularly in commercial versions which typically exceed six feet in length.

Figure 1:
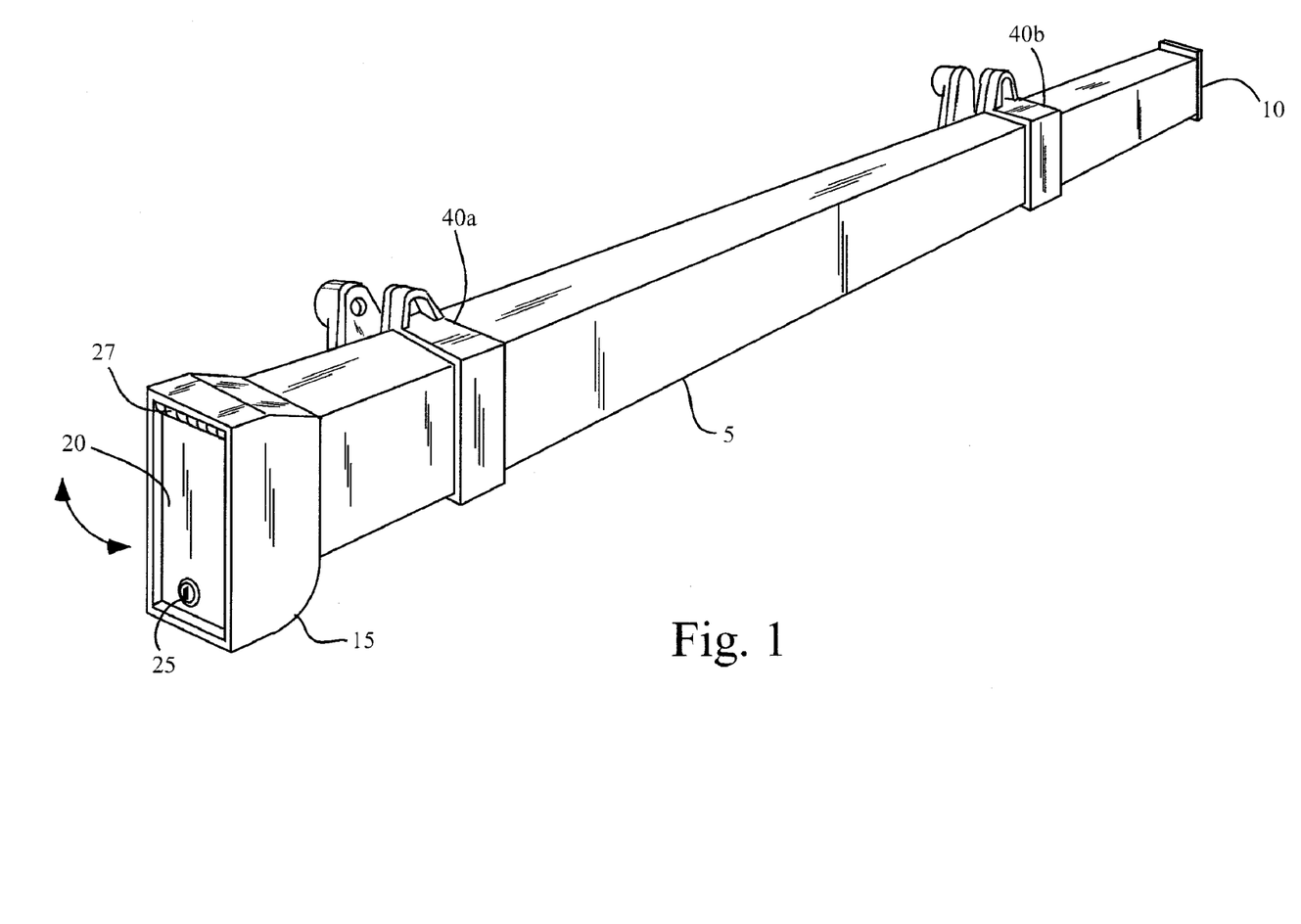
FIG. 1—depicts a prospective view of a high security exemplary embodiment.

A bend, twist, dent, gash, and/or damage to one or more of the indicator tubes could ruin a relatively expensive, but essential measuring device, resulting in inaccurate measurements and possible project delays. Referring to FIG. 1, a first high security exemplary embodiment is depicted. The container may be constructed of any lightweight and durable material, for example, aluminum, organic polymer (e.g., PVC), fiberglass or carbon fiber. The largest component of the container comprises an elongated conduit 5. The elongated conduit 5 is generally rectangular in shape although other geometric arrangements may be used as well to conform to non-traditional level form factors. The dimensions of the elongated conduit 5 are determined by the dimensions of the particular spirit level to be secured within the container. In general, the elongated conduit 5 may be provided in 72, 81 or 100 inch lengths which accounts for the long dimensions of the most common spirit levels currently in use.

The tail end of the elongated conduit 5 includes an end cap 10. The end cap 10 may be constructed from the same material(s) as the elongated conduit 5 but is typically constructed from die cast aluminum. Alternately, the end cap 10 may be constructed from a resilient polymeric material to lower manufacturing costs. In various embodiments where the measuring device container is mounted on the exterior or is otherwise exposed, the end cap is dimensioned to extend beyond at least one exterior surface to prevent the measuring device container from being forced longitudinally through the support clamps 40a, 40b. The support clamps 40a, 40b are slidably mounted on the exterior surface of the elongated conduit 5 and are dimensioned to receive U-bolts to secure the measuring device container to another structure, for example, a rack installed on a motor vehicle.

In an embodiment, a generally trapezoidal head cap 15 is affixed to a frontal end of the elongated conduit 5. Both the head cap 15 and end cap 10 are affixed to the elongated conduit 5 along a longitudinal axis and aligned in opposition to each other. The head cap 15 may also be constructed from the same materials as the elongated conduit 5 but is typically constructed from die cast aluminum to provide a more tamperproof housing when a locking assembly 25 is included.

Figures 6, 6A, 6B:
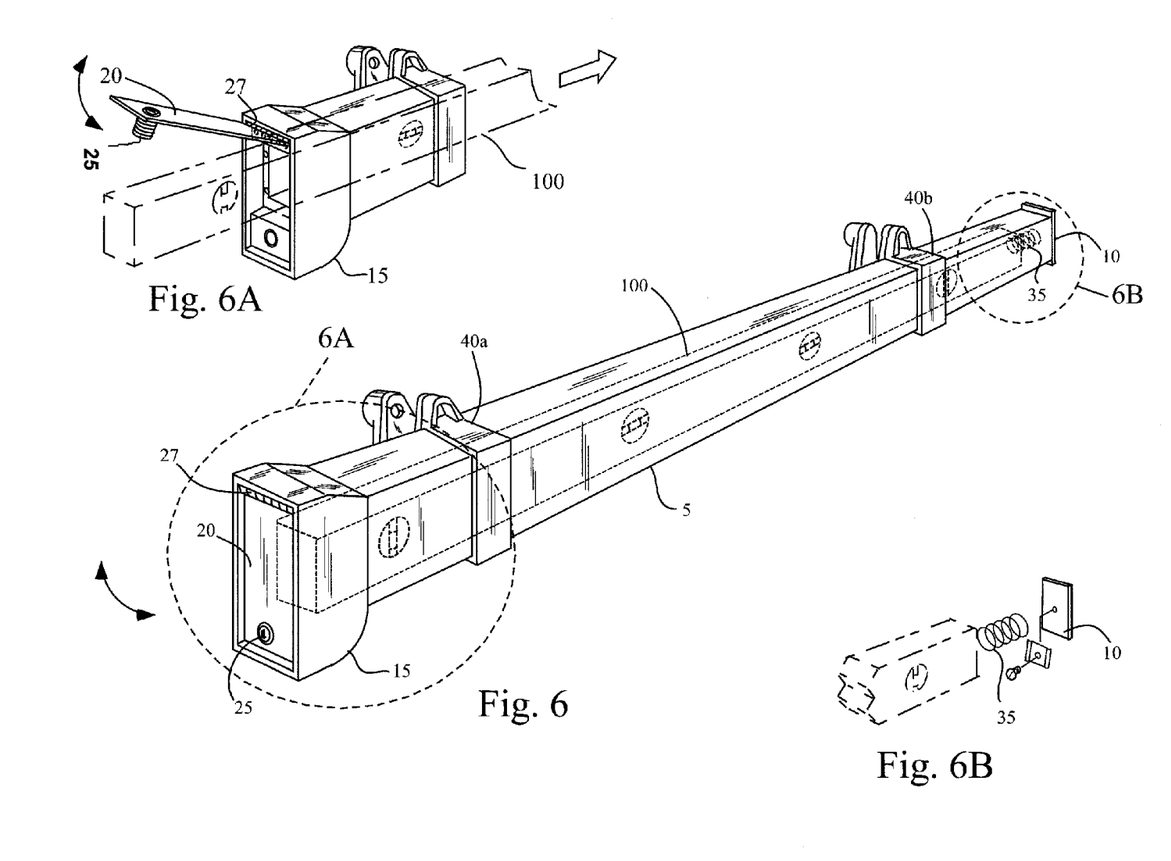

In the exemplary embodiment, the head cap 15 includes a metal door 20 pivotally affixed to the head cap 15 by a piano style hinge 27. The door 20 allows access to an interior cavity 45 (FIG. 2) containing the measuring device 100 (FIG. 6.) The door 20 may include a latch or locking assembly 25 which prevents unauthorized access to the measuring device (s) secured therein.

Figures 2, 3:
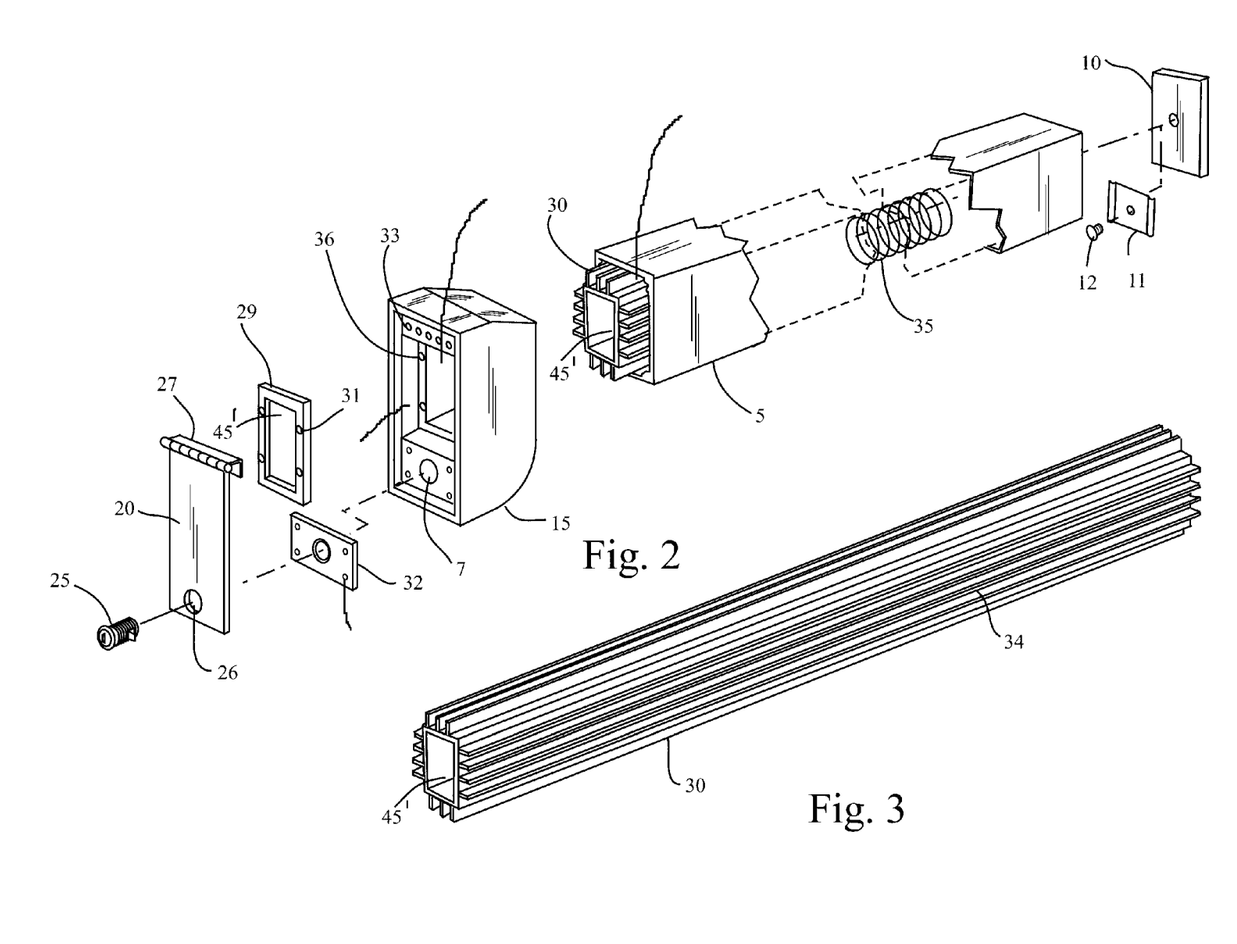
FIG. 2—depicts a cutaway prospective view of the high security exemplary embodiment.
FIG. 3—depicts a prospective view of a polymeric sleeve incorporated into the high security exemplary embodiment.

FIG. 2 depicts a cutaway view of an exemplary embodiment. In this embodiment, the end cap 10 is constructed of die case aluminum and welded to the tail end of the elongated conduit 5. In another embodiment, the end cap 10 optionally includes a rectangular rim which is compressively inserted within the interior cavity 45 of the elongated conduit 5. In this alternate exemplary embodiment, the dimensions of the rim portion of the end cap 10 are slightly larger than those of the interior cavity 45 to provide an interference fit of the rim portion of the end cap 10 into the interior cavity 45 of the elongated conduit 5. The cross sectional area of the interior cavity 45 may be varied to accommodate one or more spirit levels. Generally cross sectional areas in a range of about 4 square inches to 16 square inches allow the storage of majority of spirit levels currently used in the relevant art.

In alternate exemplary embodiment, the end cap 10 may be a plug assembly having dimensions slightly greater than the interior cavity 45 which is pressed into the interior cavity 45 of the elongated conduit 5 or dimensioned slightly smaller than the interior cavity 45 and secured by one or more fasteners or held in place by a high strength adhesive or epoxy. An optional counterforce element 35 is coupled to the end cap 10. In this exemplary embodiment, the counterforce element 35 comprises a coil spring. Alternate exemplary embodiments are envisioned in which the counterforce element 35 may be constructed from a tensile metal or a resilient polymeric material.

The counterforce element 35 is coupled to the end cap 10 using a clip 11 and a fastener 12. In the coil spring embodiment, the spring is disposed perpendicularly to the inner face of the end cap 10 and aligned to generate a counterforce in the longitudinal direction of the head cap 15 which ejects a small portion of the measuring device(s) beyond the outward face of the head cap 15 for easy removal of the measuring device(s) from the internal cavity 45. This ejection force need only be sufficient to project the measuring devices approximately 2 inches of beyond the outward face of the head cap 15 following opening of the door 20.

In this exemplary embodiment, the head cap 15 is provided with a plurality of threaded bores 33 aligned to receive a plurality of fasteners. The plurality of fasteners affixes the hinge 27 associated with the door 20 to the outward face of the head cap 15. A larger diameter bore 7 is provided on a lower portion of the head cap 15. The larger diameter bore 7 is aligned generally along a lateral centerline of the head cap 15 and offset downward from the center of the interior cavity 45 sufficiently to receive a latch associated with the locking assembly 25. The larger diameter bore 7 includes a positive locking plate 32 affixed using fasteners to the outer face of the head cap 15 which engages the latch portion of the locking assembly 25. A plurality of bore holes 28 are included in the locking plate 32 to receive the fasteners which affixes the locking plate 32 to the head cap 15.

An optional polymeric sleeve 30 is provided which is slidably disposed within the interior cavity 45 of the elongated conduit 5. The polymeric sleeve 30 provides for scratch and abrasion protection of the measuring device(s) during insertion and removal. The sleeve 30 is dimensioned to approximate the cross-sectional area of the interior cavity 45 and extends longitudinally from about the head cap 15 to a location in close proximity to the forward most portion of the counterforce element 35. The polymeric sleeve includes a smaller interior cavity 45' to contain the measuring device(s) to be stored therein. The polymeric sleeve 30 is inserted into the interior cavity 45 of the elongated conduit 5 before the head cap 15 is affixed to the elongated conduit 5.

A separate mounting plate 29 is provided to affix the head cap 15 to the elongated conduit 5. The mounting plate 29 includes an aperture 45' which is dimensioned to allow one or more measuring devices to be slidably inserted into the interior cavity 45' of the polymeric sleeve 30.

Figure 3A:
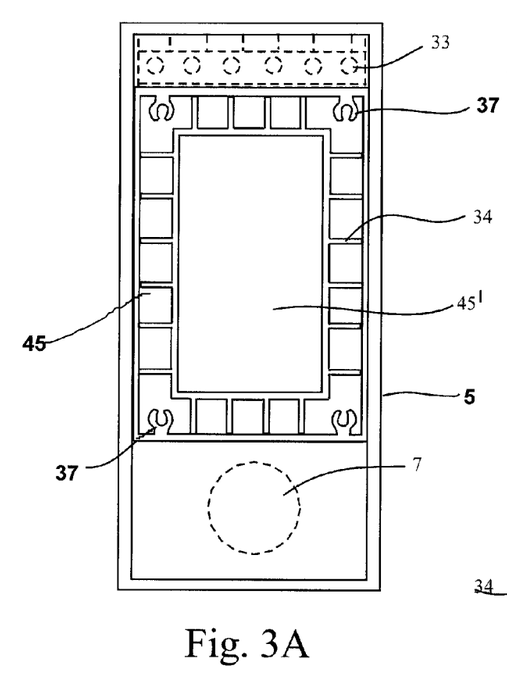
FIG. 3A—depicts a front view of a head end with the polymeric sleeve inserted.
Figure 3B:
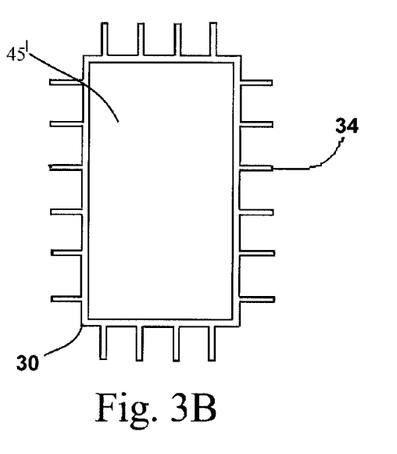
FIG. 3B—depicts a front view of the polymeric sleeve incorporated into the security exemplary embodiment.

The head cap 15 includes a recessed cavity 16 incorporated into the outer face of the head cap 15 which receives the mounting plate 29. The mounting plate 29 is provided with a plurality of bore holes 31 which align with a plurality of coupling bores 36 provided in the recessed cavity 16. The elongated conduit 5 includes a coupling assembly having a plurality of threaded flanges 37 (FIG. 3A) aligned with the plurality of bore holes 31 and coupling bores 36. The coupling assembly is either welded or formed into the elongated conduit 5 during the extrusion process and is aligned in parallel to the outer face of the head cap 15. A plurality of threaded fasteners is disposed into the plurality of bore holes 31 and coupling bores 36 and threaded into the threaded flanges 37 which securely affix the mounting plate 29 and head cap 15 to the elongated conduit 5.

Figure 3C:
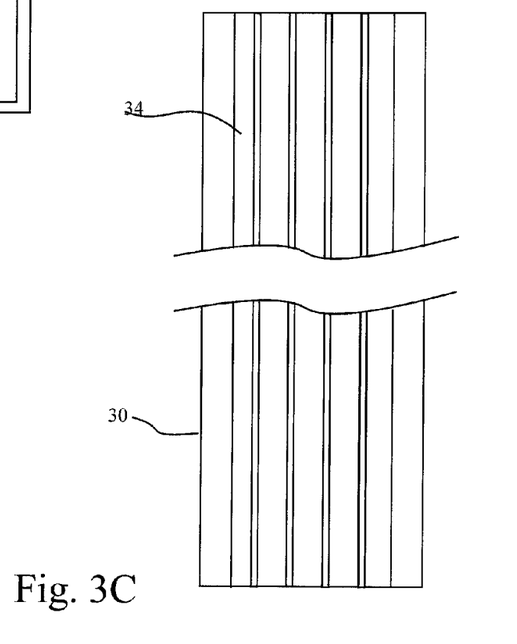
FIG. 3C—depicts a top view of the polymeric sleeve incorporated into the high security exemplary embodiment.

Referring to FIGS. 3, 3A-3C, the exterior of the polymeric sleeve 30 includes a plurality of resilient contact surfaces 34 which deform as the polymeric sleeve 30 is inserted into the interior cavity 45 of the elongated conduit 5. In this exemplary embodiment, the plurality of resilient contact surfaces 34 are comprised of raised fins or ridges 34 which are periodically distributed about the sleeve's outer circumference (FIG. 3B) and extend the length of the polymeric sleeve 30 (FIG. 3C.) The plurality of resilient contact surfaces 34 provides a snug or interference fit with the interior walls of the elongated conduit 5 and retains the polymeric sleeve 30 in place within the interior cavity 45 of the elongated conduit 5.

Figures 4, 5:
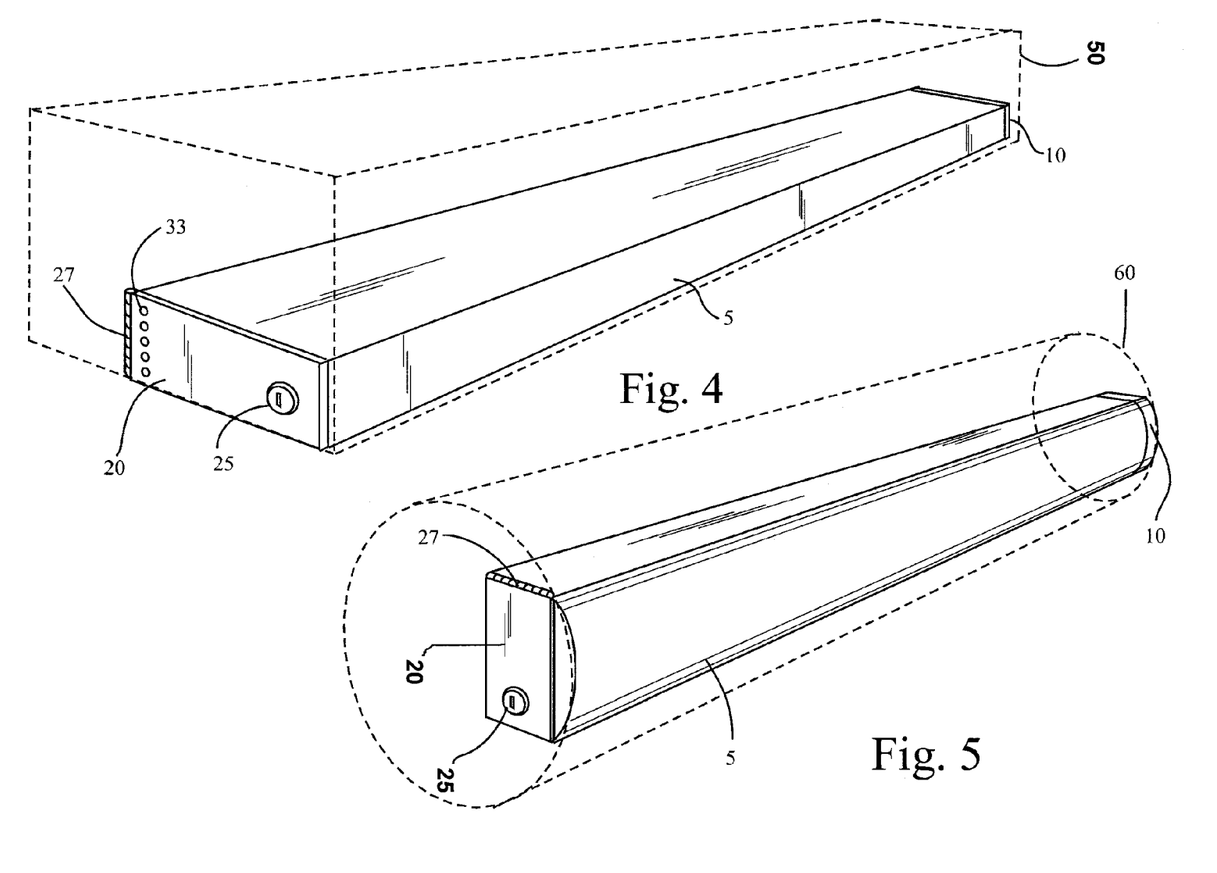
FIG. 4—depicts a prospective view of a standard security exemplary embodiment.
FIG. 5—depicts a prospective view of a standard security exemplary embodiment dimensioned for installation within a generally cylindrical storage container.

Referring to FIGS. 4 and 5, the measuring device containers may be dimensioned to fit within existing cargo containers 50, 60. For example, a simple generally rectangular adaptation may be accomplished which eliminates the separate head cap 15 and incorporates the door 20, hinge 27 and optionally the locking assembly 25 directly onto the elongated conduit 5. These exemplary arrangements are intended for installation within a common rectangular cargo container 50.

Alternately, a simple partially cylindrical adaptation may be accomplished which likewise eliminates the separate head cap 15 and incorporates the door 20, hinge 27 and locking assembly 25 directly into the elongated conduit 5. The elongated conduit includes a partial cylindrical outer contour which facilitates the installation inside common PVC tube or like cargo containers 60. In both exemplary embodiments, the measuring device containers are affixed to the interior cavities of the cargo containers 50, 60 using fasteners. In addition, the locking assemblies 25 may be replaced with simple latches in situations where the cargo containers 50, 60 already include separate locking mechanisms.

Figure 6C:
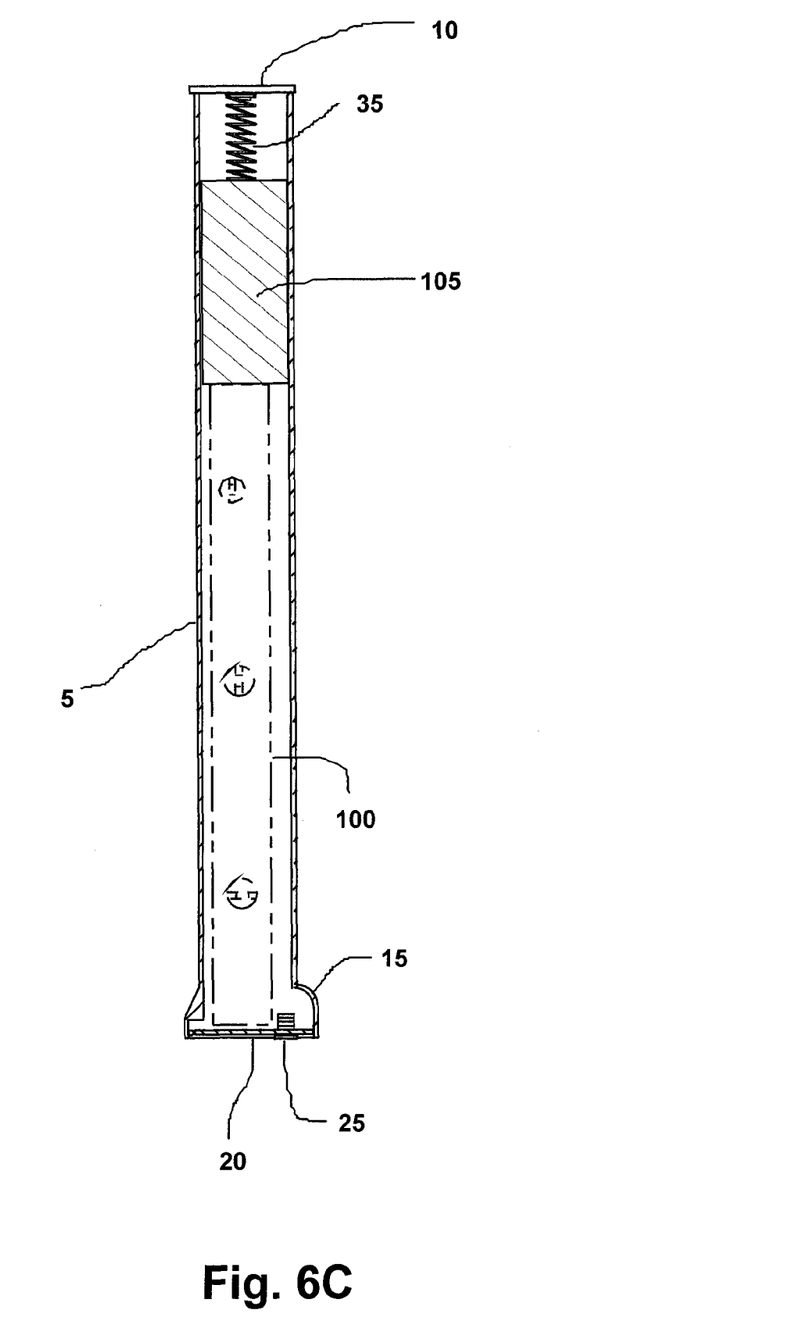
FIG. 6C—depicts a side view of the high security exemplary embodiment containing a measuring device and an optional spacer.

Referring to FIGS. 6, 6A, 6B, 6C an exemplary usage is depicted where the measuring device container may be disposed on a motor vehicle or placed in a work area for installation of compatibly sized measuring devices (spirit levels.) For embodiments where a locking assembly 25 is employed, the associated key to the lock is used to open the door 20 which allows access to the interior cavity 45' of the polymeric sleeve 30. The measuring device 100 is slidably disposed (FIG. 6A) within the interior cavity 45' until an end of the measuring device compressively contacts the counterforce element 35 (FIG. 6B.) At this point, the door 20 is closed and latched, thus securing the measuring device 100 within the measuring device case as is shown in FIG. 6C. An optional spacer 105 may used to secure measuring devices 100 of various lengths within the container. The spacer 105 is dimensioned to fit within the interior cavity 45' of the polymeric sleeve 30 or elongated conduit 5 sufficient to provide the necessary counterforce to eject a contained measuring device 100 through the head cap 15. The spacer may be constructed from any common material such as wood, fiberglass, organic polymer or lightweight metal.

Figure 7:
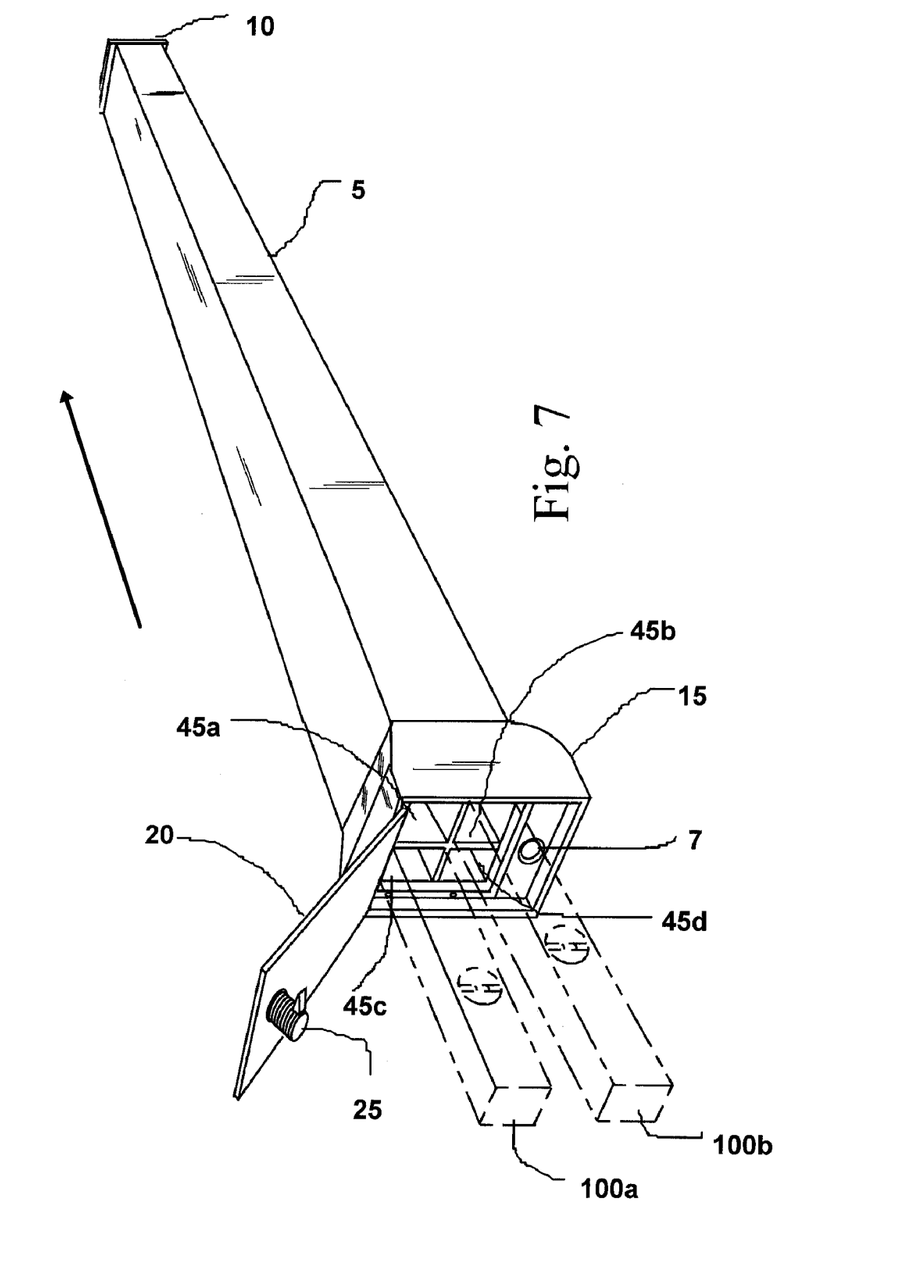
FIG. 7—depicts a prospective view of an alternate embodiment of the high security exemplary embodiment having multiple interior storage cavities.

Another high security embodiment is provided in FIG. 7 where the components comprising the measuring device container are dimensioned to receive a plurality of measuring devices 100A, 100B. In this exemplary embodiment, the polymeric sleeve 30 includes a plurality of interior cavities 45a, 45b, 45c, 45d which allows for the secure storage of the plurality of measuring devices 100a, 100b. Other aspects, other than component scale and additional counterforce elements 35 are identical to the high security embodiment previously described.

Figure 8:
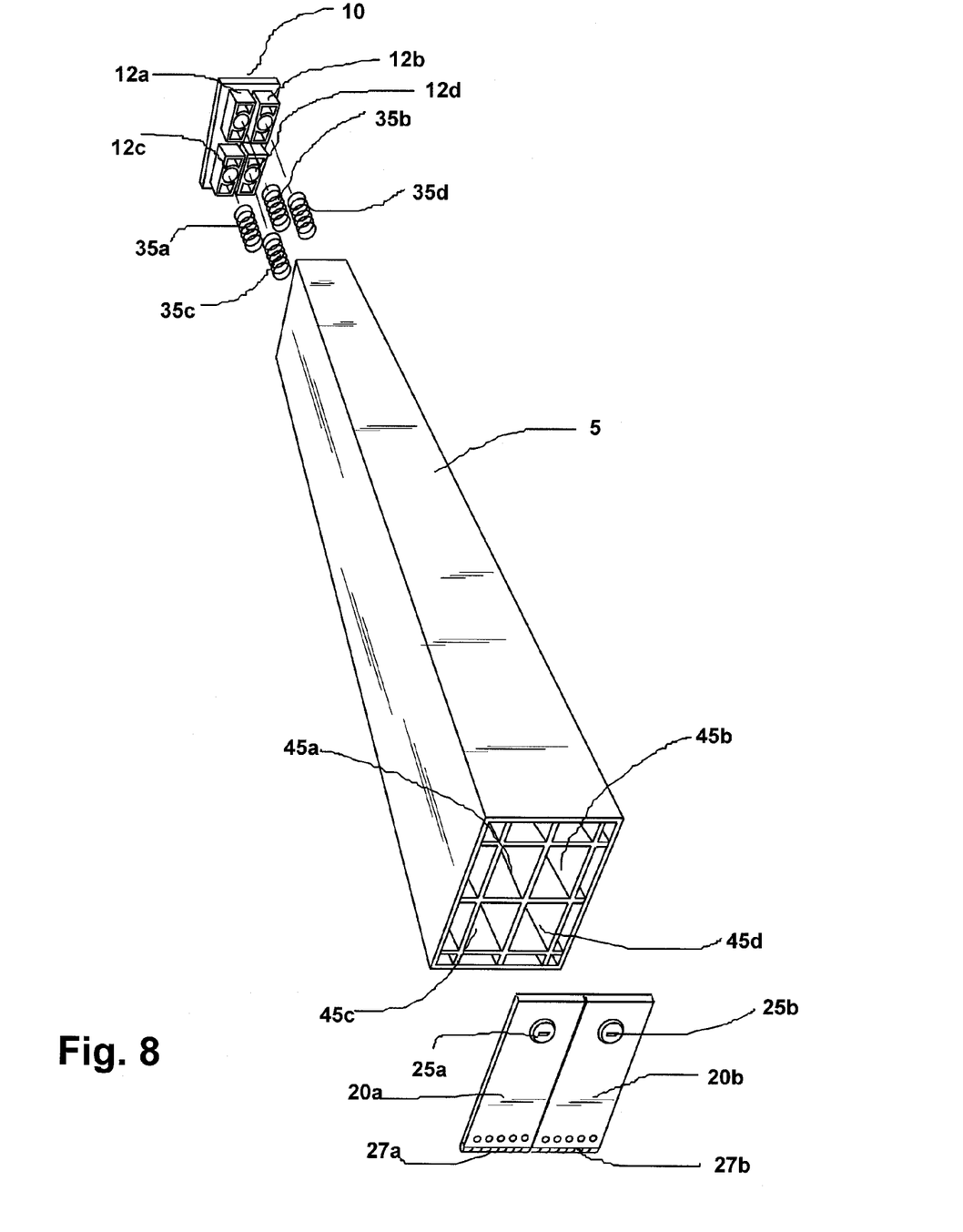
FIG. 8—depicts a prospective view of another alternate embodiment of the standard security exemplary embodiment having multiple interior storage cavities.

FIG. 8 depicts another standard security embodiment which is likewise intended to maintain a plurality of measuring devices 100a, 100b (FIG. 7.) In this exemplary embodiment, the elongated conduit 5 and end cap 10 are constructed from an organic polymer such as polyvinylchloride (PVC) by either an injection modeling or extrusion process. The elongated conduit is manufactured with a plurality of interior cavities 45a, 45b, 45c, 45d dimensioned to receive the plurality of measuring devices 100a, 100b. The end cap 10 includes a plurality of longitudinally aligned receptacles 12a, 12b, 12c, 12d which are dimensioned to receive a plurality of counterforce elements 35a, 35b, 35c, 35d. One or more doors 20a, 20b are affixed to the elongated conduit by one or more hinges 27a, 27b using common fasteners. One or more optional locking assemblies 25a, 25b may be provided to secure the plurality of measuring devices within the internal cavities 45a, 45b, 45c, 45d. This standard security embodiment does not require the head cap 15 employed in the high security embodiments.

The foregoing described exemplary embodiments are provided as illustrations and descriptions. They are not intended to limit the various exemplary embodiments to a precise form or any specific dimensions described. In particular, it is contemplated that functional implementation described herein may be accomplished using a variety of suitable polymeric, fiberglass, carbon fiber or metal materials either alone or in combination therewith. Other variations and embodiments are possible in light of above teachings, and it is not intended that this Detailed Description limit the inventive scope but rather by the Claims following herein.

What is claimed:

1. A container for holding a measuring device comprising:
an elongated conduit including
an interior cavity dimensioned to fully encompass the measuring device;
a polymeric liner dimensioned to fit within the interior cavity, the polymeric liner extending a length of the interior cavity of the elongated conduit and including at least four resilient contact surfaces disposed on an outer surface of the liner, and the resilient contact surfaces arranged to uniformly engage a portion of an interior surface of the elongated conduit sufficient to maintain the polymeric liner within the interior cavity; and, a head cap coupled to a first longitudinal end of the elongated conduit, the head cap including:
  a generally trapezoidal side profile;
  a frontal cross sectional dimension greater than a frontal cross sectional dimension of the elongated conduit;
  an aperture in communication with the interior cavity, the aperture dimensioned to receive the measuring device therethrough; and,
  a door coupled to a frontal face of the head cap and dimensioned to laterally span the aperture when disposed in a closed position; and,
  an end cap coupled to a second longitudinal end of the elongated conduit; and
a counterforce element disposed within the elongated conduit, the counterforce being coupled to the end cap and aligned to generate a longitudinal counterforce on the measuring device when an end of the measuring device compressively engages the counterforce element.

2. The container according to claim 1 wherein the door includes a latch configured to maintain the door in the closed position.

3. The container according to claim 2 wherein the latch includes a lock.

4. The container according to claim 1 wherein the elongated conduit is constructed from one of: extruded aluminum, an impact resistant polymeric material, carbon fiber, fiberglass and any combination thereof.

5. The container according to claim 1 further including a plurality of mounting brackets disposed on an outer surface of the elongated conduit; the mounting brackets being configured to attach the container to a rack disposed on a motor vehicle.

6. The container according to claim 1 wherein the elongated conduit has a long dimension of at least 81 inches.

7. The container according to claim 1 wherein the elongated conduit has a long dimension in a range of about 72 to 100 inches.

8. The container according to claim 1 wherein the elongated conduit has an interior cross-sectional area of at least 4 square inches.

9. The container according to claim 1 wherein the elongated conduit has an interior cross-sectional area of at least 16 square inches.

10. The container according to claim 1 wherein the elongated conduit has an interior cross-sectional area in a range of about 4 to 16 square inches.

11. A container for holding a measuring device comprising:
  an elongated conduit including
  an interior cavity dimensioned to fully encompass the measuring device;
  a polymeric liner dimensioned to fit within the interior cavity, the polymeric liner extending a length of the interior cavity of the elongated conduit and including at least four resilient contact surfaces disposed on an outer surface of the liner, the resilient contact surfaces arranged to uniformly engage a portion of an interior surface of the elongated conduit sufficient to maintain the polymeric liner within the interior cavity;
  a first longitudinal end having an aperture dimensioned to receive the at least one measuring device therethrough;
  an end cap laterally coupled to a second longitudinal end of the elongated conduit;
  a door coupled to the first longitudinal end and dimensioned to laterally span the aperture when disposed in a closed position; and,
  a lockable latch coupled to the door and configured to maintain the door in the closed position; and
  a counterforce element disposed within the elongated conduit and longitudinally coupled to the end cap, the counterforce element being aligned to generate a longitudinal counterforce on the at least one measuring device when an end of the at least one measuring device compressively engages the counterforce element.

12. The container according to claim 11 wherein the elongated conduit is dimensioned to slidably fit within another container.

13. The container according to claim 11 wherein the elongated conduit has a long dimension in a range of about 72 to 100 inches.

14. A container for holding an elongated measuring device comprising:
  an elongated conduit having a long dimension in a range of about 72 to 100 inches and including
  an interior cavity having a cross-sectional area in a range of about 4 to 16 square inches, the interior cavity being dimensioned to fully encompass the elongated measuring device;
  a polymeric liner dimensioned to fit within the interior cavity, the polymeric liner extending a length of the interior cavity of the elongated conduit and including at least four resilient contact surfaces disposed on an outer surface of the liner, and the resilient contact surfaces arranged to uniformly engage a portion of an interior surface of the elongated conduit sufficient to maintain the polymeric liner within the interior cavity;
  a head cap coupled to a first longitudinal end of the elongated conduit, the head cap including an aperture in communication with the interior cavity, the aperture being dimensioned to receive the elongated measuring device therethrough;
  an end cap coupled to a second longitudinal end of the elongated conduit;
  a door coupled to the head cap and dimensioned to laterally span the aperture when disposed in a closed position; and,
  a lockable latch coupled to the door and configured to maintain the door in the closed position; and
  a counterforce element disposed within the elongated conduit and longitudinally coupled to the end cap, the counterforce element being aligned to generate a longitudinal counterforce on the at least one measuring device when an end of the at least one measuring device compressively engages the counterforce element.

15. The container according to claim 14 further including a plurality of mounting brackets disposed on an outer surface of the elongated conduit, the mounting brackets being configured to attach the container to a rack disposed on a motor vehicle.

16. The container according to claim 14 further including a spacer dimensioned to slidably fit within the at least one interior cavity.

* * * * *